United States Patent [19]
Barnard et al.

[11] 4,432,928
[45] Feb. 21, 1984

[54] PROCESS OF MOULDING FILLED CURABLE COMPOSITIONS

[75] Inventors: John Barnard, Letchworth; Sandor Z. M. Padanyi, Welwyn Garden City, both of England

[73] Assignee: Imperial Chemical Industries PLC, London, England

[21] Appl. No.: 375,221

[22] Filed: May 5, 1982

[30] Foreign Application Priority Data

May 14, 1981 [GB] United Kingdom ............... 8114968

[51] Int. Cl.³ .............................................. B29F 1/08
[52] U.S. Cl. .................................... 264/519; 264/85; 264/327; 264/328.13; 264/500; 425/546
[58] Field of Search .................... 264/85, 328.13, 500, 264/519, 327; 425/546

[56] References Cited

U.S. PATENT DOCUMENTS 4,333,901  6/1982  Young ............................... 264/85

FOREIGN PATENT DOCUMENTS 13154     9/1980  European Pat. Off. .
46-8043   9/1972  Japan ................................. 264/85
55-113539 9/1980  Japan ................................. 264/85
1023888   3/1966  United Kingdom .
1462586   1/1977  United Kingdom .
1493393  11/1977  United Kingdom .
1514032   6/1978  United Kingdom .

Primary Examiner—Thomas P. Pavelko
Attorney, Agent, or Firm—Cushman, Darby & Cushman

[57] ABSTRACT

A method of moulding a shaped article from a curable composition in which the composition is cured in a mould comprising at least two mould parts defining a cavity characterized in that prior to introducing the curable composition into the mould cavity, the pressure inside the cavity is increased above atmospheric pressure, preferably to at least 0.3 bar above atmospheric pressure, the dispersion is injected into the mould against this pressure and is subsequently cured. The method is useful for overcoming problems of color banding on the surface of the moulding which originate in the filling process and are particularly evident when high mould temperatures are used.

6 Claims, No Drawings

PROCESS OF MOULDING FILLED CURABLE COMPOSITIONS

This invention relates to a process of moulding shaped articles from fluid, curable resin compositions.

Fluid, curable compositions suitable for forming moulded articles are well known. For reasons of cost and performance in service these compositions normally contain substantial amounts of filler. Typical compositions are described, for example, in British Patent Specification No. 1,493,393. This specification discloses low viscosity compositions containing at least 20% by volume of finely divided fillers in a state of stably deflocculated dispersion in a polymerisable liquid. A polymeric dispersant is used to obtain the stably deflocculated dispersion. Preferred compositions have a viscosity of less than 50 poise at the temperature at which the composition is to be moulded. These are suitable for moulding shaped articles in a process in which the low viscosity dispersion is introduced into a mould and cured under the influence of heat and/or a catalyst to give a shaped article which replicates the shape of the mould. In most of the curable systems described a volume shrinkage occurs as the composition is cured so that it is necessary to make provision for the surfaces of the mould to maintain contact with the composition as it changes from the fluid to the cured stated. This is not easy to achieve when the moulding to be produced is a complex shaping. In particular, the depth of shrinkage occurring in portions of the mould which are disposed in vertical or steeply inclined positions will be considerably greater than the depth of shrinkage occurring in a portion which is horizontally disposed, even though the actual thickness of these two portions is the same. In these circumstances it is difficult to devise a mould closing technique which will compensate for this variable depth of shrinkage. For a majority of applications it is sufficient if only one of the faces of the article has a blemish-free surface and is free from shrinkage marks. For example, in the case of an article of sanitaryware it is sufficient if the exposed or show-face is the only blemish-free surface. Articles with at least one such surface are produced by using paired moulds which are maintained at different temperatures so that polymerisation takes place preferentially against the mould surface at the higher temperature. This ensures that the shrinkage takes place away from the lower temperature surface. It has been found that this procedure of using a heated mould can create further problems relating to the visual appearance of the moulded articles. Thus although the procedure gives a smooth surface free from shrinkage marks various flow patterns can be seen below the surface of the moulding. These flow patterns originate at the point in the mould at which the flowable dispersion is injected and are observed as flow bands separated by distances of from 1 mm to 10 mm. The bands are particularly prominent when the filler of the composition is light in colour and the composition also contains a dark pigment. A method of reducing the occurrence of these unattractive flow bands has now been developed.

Accordingly there is provided a method of moulding a shaped article from a filled, curable composition in which the composition is cured in a mould comprising at least two mould parts defining a cavity characterised in that prior to introducing the curable composition into the mould cavity, the pressure inside the cavity is increased above atmospheric pressure, preferably to at least 0.3 bar above atmospheric pressure, the dispersion is injected into the mould against this pressure and is subsequently cured. The pressure inside the cavity is increased to at least 0.3 bar above atmospheric pressure by the introduction of any gas, such as air or nitrogen, which does not significantly affect the curing process. Excellent results are obtained using pressures between 0.5 and 5.0 bar above atmospheric pressure. No additional advantage is obtained in using pressures in excess of 10 bar over atmospheric pressure. It is not essential to the process that this excess pressure is maintained during the curing process and the pressure may be released immediately the mould has been filled. The process is particularly useful when the difference in mould temperature between any two mould parts is at least 10° C.

Surprisingly this process modification greatly reduces the problem of flow bands and the resulting cured articles have an excellent surface appearance on at least one surface of the cured article.

The process of the invention is particularly useful for the production of shaped articles from dispersions containing a high concentration (at least 20% by volume, and preferably at least 40% by volume) of finely divided fillers in methyl methacrylate monomer. Such dispersions may give rise to the problem of colour banding when injected into a cavity formed from a pair of moulds, at least one of which is at a temperature of at least 70° C. The problem increases in severity as the mould temperature increases and is particularly severe when at least one of the mould surfaces is at least 80° C. The extent of this problem is greatly reduced by using the mould filling process according to the invention.

Low viscosity, curable compositions such as described in British Patent Specification No. 1,493,393 and particularly highly filled methyl methacrylate dispersion are suitable for the production of shaped articles, such as articles of sanitaryware, including wash basins, vanitory unit tops, shower trays and table tops. The process of the invention enables such articles to be produced having at least one blemish-free surface and without adventitious patterned effects arising from the high filler content of the dispersion.

The invention is further illustrated by reference to the following examples.

COMPARATIVE EXAMPLE A

A dispersion of finely divided silica in methyl methacrylate (prepared according to Example 5 of British Patent Specification No. 1,493,393) and containing 0.5% by weight of pigments to give a brown colour was injected into a 225 mm diameter disc mould the surfaces of which were maintained at 65° C. and 60° C. respectively. After a period of 30 minutes the cured moulding was removed and found to have a smooth, glossy surface with no significant flow lines marring the appearance of the sheet. The procedure was repeated using mould temperatures of 85° C. and 45° C. respectively. After a period of 30 minutes the cured moulding was removed from the mould. Although the surface of the article which has been contacted by the mould surface which has been maintained at 85° C. was reasonably smooth and free from shrinkage marks it exhibited flow bands over most of the surface. These were particularly evident around the point at which the dispersion was injected into the mould.

EXAMPLE 1

The procedure used in Comparative Example A was repeated except in that before introducing the filled dispersion into the mould (with the mould surfaces at 85° C. and 45° C. respectively), the mould was pressurised to a pressure of 1 bar above atmospheric pressure with compressed air, the mould cavity being connected to a pressure relief valve so that the pressure was maintained at 1 bar above atmospheric pressure during the period of filling the mould. After the mould was filled the pressure was reduced to atmospheric pressure and the mould surface temperatures maintained at 85° C. and 45° C. respectively for 30 minutes. The moulding produced had an excellent surface finish on the surface contacting the 85° C. mould, being free from the flow bands observed in Comparative Example A.

The procedure was repeated using the same dispersion except in that the pigment was a mixture giving a dark green colour. The moulding produced had an excellent surface on the surface polymerised in contact with the 85° C. mould surface.

We claim:

1. A method of moulding a shaped articled from a filled, curable composition having a viscosity of less than 50 poise at the temperature at which the composition is to be moulded and containing at least 20% by volume of a finely divided filler in which the composition is cured in a mould comprising at least two mould parts defining a cavity at least one of said mould parts being at a temperature of at least 70° C. wherein prior to introducing the curable composition into the mould cavity, the pressure inside the cavity is increased above atmospheric pressure, the dispersion is injected into the mould against this pressure and is subsequently cured.

2. A process according to claim 1 wherein the pressure inside the cavity prior to introduction of the dispersion is between 0.5 and 5.0 bar above atmospheric pressure.

3. A process according to claim 1 in which the mould parts are maintained at different temperatures and the temperature difference between any two mould parts is at least 10° C.

4. A process according to claim 1 in which the pressure in the cavity introduced during the mould filling process is released prior to curing the composition.

5. A process according to claim 1 in which the curable constituent of the composition is methyl methacrylate.

6. A process according to claim 1 wherein the pressure inside the cavity prior to introduction of the dispersion is at least 0.3 bar above atmospheric pressure.

* * * * *